July 8, 1930.  M. M. TITTERINGTON  1,770,243
ROTARY COIL COMPASS
Filed March 11, 1922   2 Sheets-Sheet 1
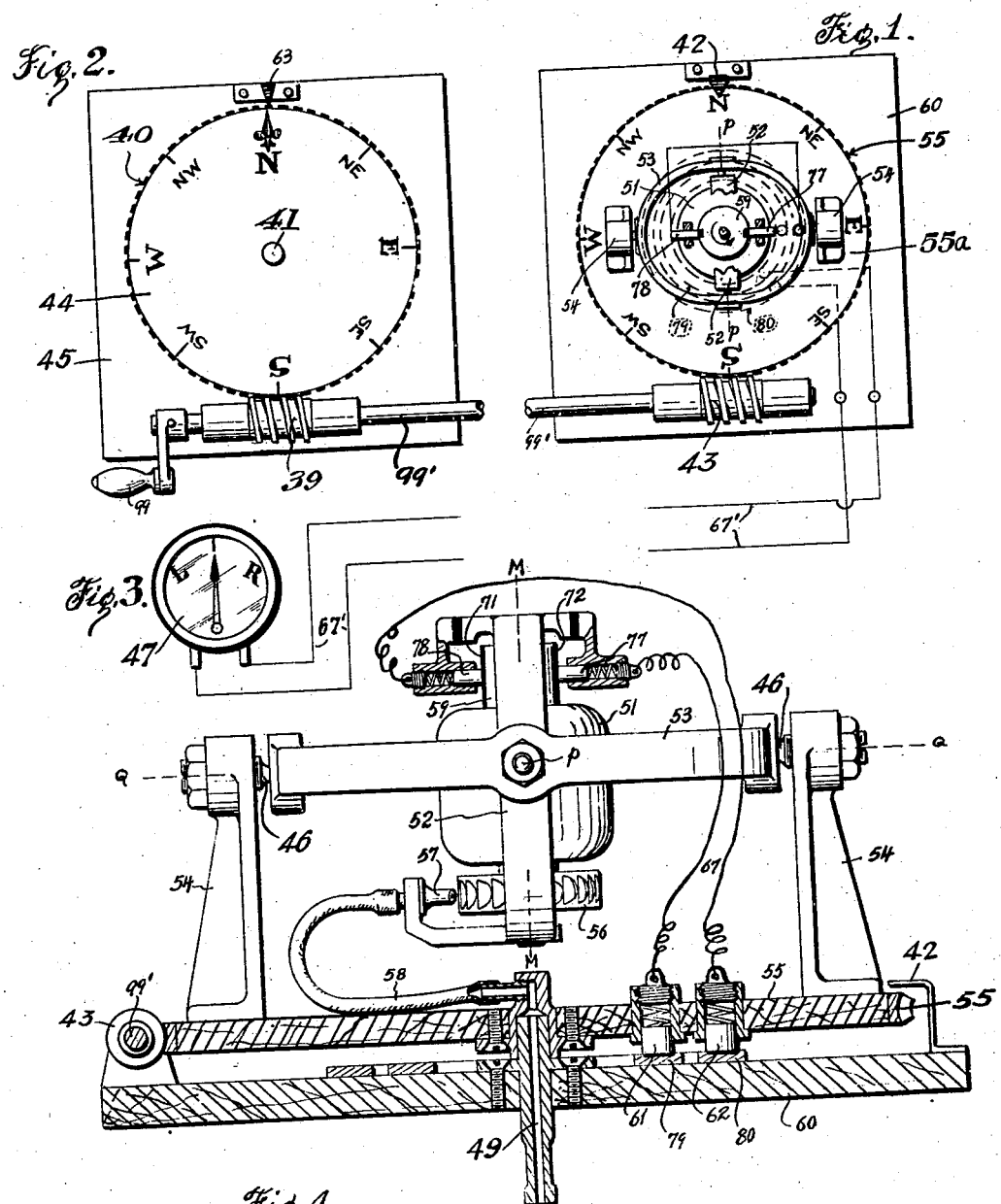
INVENTOR
Morris M. Titterington
BY
James C. Ledbetter ATTORNEY July 8, 1930.  M. M. TITTERINGTON  1,770,243
ROTARY COIL COMPASS
Filed March 11, 1922   2 Sheets-Sheet 2

INVENTOR
Morris M. Titterington
BY
James C. Ledbetter  ATTORNEY

Patented July 8, 1930

1,770,243

UNITED STATES PATENT OFFICE

MORRIS M. TITTERINGTON, OF BROOKLYN, NEW YORK; GEORGE A. TITTERINGTON, EXECUTOR OF SAID MORRIS M. TITTERINGTON, DECEASED, ASSIGNOR TO PIONEER INSTRUMENT COMPANY, INCORPORATED, OF BROOKLYN, NEW YORK, A CORPORATION OF NEW YORK

ROTARY COIL COMPASS

Application filed March 11, 1922. Serial No. 542,937.

This invention relates in general to compasses, and more particularly to a new type of rotary coil compass, or what may be referred to as an earth inductor compass which operates by measuring or ascertaining the direction of the earth's flux.

It is an object of this invention to produce an improved compass which more accurately and dependably indicates and points out directions than compasses now in use, and which avoids many of the difficulties experienced with ordinary magnetic compasses and with other compasses as well.

An object of the invention is to provide means for maintaining the proper position of the inductor plane of a compass generator so as to cause a zero indication on a steering or deviation meter or indicator, such as a galvanometer, when the vehicle on which the compass is being used is headed in a compass direction corresponding to the indication of a course setting controller device and to cause the deviation indicator to show the direction in which the vehicle is turned off the course indicated by said course setting controller.

An outstanding object is to improve inductor compass systems by devising a novel course setting instrument which I have named a compass direction controller and which I include as a new element in the compass combination and by which an operator orients, or sets and resets at will, the commutator brushes of an inductor generator which is another element of my new combination. My new controller measures the angle of turn through which the brushes are oriented and directly indicates such measurement in terms of compass direction. Thus my invention includes a new instrument as a novel element in the compass system, and also comprises in itself a new combination.

Of equal importance are my inductor generator improvements, and it is an object to improve inductor generators so that the controller may be connected with it. This I do by producing a generator whose commutator brushes are carried by rotary mounting means, or the entire generator may be carried thereby, the purpose of which is to enable the brushes or armature to be adjustably oriented, turned or set in azimuth at the will of the operator by use of the new controller. A gear reduction transmission or one gear thereof or other suitable motion transmitting means is included as a part of the brush rotating means by which the controller is operatively connected with the generator.

Another important object is to improve the generator in respect to its stabilization without addition of parts or weight and this is accomplished by utilizing the armature as a rotor to produce the necessary gyroscopic force which acts through universally pivoted supporting means carrying the armature to effect its stabilization, and thus the armature is inherently stabilized. Thus I utilize the armature to produce two useful forces to-wit, electric potential and gyroscopic force. In this way, the weight, size and number of parts composing the generator are reduced.

Another object is to produce a compass which gives an indication of direction at one or more positions remotely located from the place at which the direction of the earth's magnetic flux is measured, thus permitting the measurement of the flux at a position where it is least disturbed by iron masses or other local magnetic disturbances. It is also an object to indicate the direction of the flux at any other place or places where it may be of value to know said direction.

While this compass will be found suitable for all navigation purposes, it is particularly useful on aircraft, where the ordinary compass is unsatisfactory in operation due to the movements and inertia of the craft and to the magnetic effect of the engines which in most cases are close to the position where the ordinary compass must be mounted so as to be seen by the pilot.

In compasses heretofore proposed, certain practical difficulties have been inherent. These I have overcome by my invention in ways which will now be explained and by which the foregoing objects are attained.

The aforesaid difficulties have arisen both in the generation of electric potential by a rotating coil or armature cutting the earth's magnetic flux lines and in obtaining directive indications therefrom. The difficulties in generation have been due both to the effect of the movements of the craft upon which the compass was mounted and to the distortion of the magnetic flux lines by the counter magnetomotive force due to the flow of electric current while indications were being secured. The solution of the first difficulty has heretofore been attempted by the stabilization of the generator, but this involved the addition of complicated or heavy auxiliary apparatus which was found objectionable in several particulars, but my invention accomplishes this in a practical way with lightweight construction and by omitting additional parts.

In order to successfully overcome the several difficulties heretofore encountered, I have produced, among other things, as already suggested, a new electric generator for earth inductor compasses wherein the armature is itself the gyroscopically stabilizing means and thus the generator is inherently stabilized. I have also produced a novel direction controller which itself includes heading or direction indicating means and by which the generator, particularly the current collecting brushes thereof, is adjustably turned or oriented about a normally vertical axis by which the operator at will and from a distant point readily resets the armature brushes to attain for them a position of null reading on the deviation or steering indicator. I have also discovered that it is not necessary to stabilize the armature itself, provided the brushes be stabilized and so long as the position of the armature axis be susceptible to control as by carrying the generator and/or its commutator brushes on rotary mounting means by which orientation is effected. This I have illustrated as a modification in Figure 8. The principle is the same in either case or form of the invention, as well as in other forms of construction, and may be expressed as follows:

The operation of the compass will be unaffected by movements of the craft upon which it is carried if the armature of the generator and the commutator brushes are so related to each other and to the earth's field, that the inductor plane of the armature is established or maintained perpendicular to a plane defined by the armature axis and the direction of the earth's flux. By mounting the commutator brushes and/or the armature axis dirigible in azimuth, i. e. on the aforesaid rotary mounting means, and by stabilizing the brushes and/or the armature axis, the above relations are maintained established or brought about. To attain this end is one of the broad purposes of the invention, and for this purpose I provide a compass controller as a fundamentally new element for use in inductor compasses to set and establish or maintain the brushes in proper position and I provide stabilizing means to maintain the armature or brushes in proper position. The controller is usually manually operated while the stabilization is continuous in performance and motor driven.

By the "inductor plane of the armature" is meant a plane passing through the armature axis and having, for any particular generator, a fixed relation to the brush plane, that is, parallel to the brush plane or to some definite angle to the brush plane depending upon the type of armature winding, upon the method of connecting the armature winding to the commutator and upon the spacing between brushes. The brush plane is a plane passing through the brushes and coinciding with or lying parallel to the armature axis. The fixed position of the inductor plane with reference to the brush plane may be determined by moving the brush plane either by rotating the brushes or by rotating the armature axis or by rotating the brushes and rotating the armature axis until a galvanometer or other suitable indicator shows zero potential between the brushes. The inductor plane is then perpendicular to a plane coincident with the armature axis and lying parallel to the magnetic field.

If the armature be considered as having simple open coil windings, the "inductor plane of the armature" is the plane of any winding at the instant it reaches its mean position in circuit with the commutator brushes. If the armature be considered as having a single turn of wire connected to a single pair of commutator segments of width equal to the width of the brushes, the inductor plane of the armature is the plane of this turn of wire at the instant when the commutator segments and brushes are in matched position. If the armature be considered as having any form of winding with any number of turns of wire and any number and width of commutator segments, the inductor plane has the same fundamental relation to the brushes as in such single wire form.

Obtaining of directive indications from the generated electric potentials have heretofore involved further difficulties. While some inventors have realized the advantage of using an electric deviation indicator which might give a null reading when the craft is upon the desired course, all have failed to recognize the advantages of so coordinating the generator and deviation or steering indicator that there is no current flow when the craft is upon the desired course. I have combined with my new generator, having the before-described characteristics and novel features, an electric potential transmission and indicating system free from the defects of compasses previously proposed, together with a compass direction controller, my whole system being not only theoretically correct but of great practical use upon aircraft and elsewhere.

The accompanying drawings illustrate practical examples of embodiments of my invention and though there are described preferred forms and operations, I claim the right of protection as to all changes and modifications as may properly come within the scope and principle of my invention.

Figure 1 shows a plan view of the inductor generator carried upon rotary mounting means by which the commutator brushes are adapted to be oriented about a normally vertical axis and in which the generator is stabilized. A fragment of the controller shaft and its drive gear is shown connected to the rotary mounting means of the generator.

Figure 2 shows a plan view of the compass direction controller in one of its simplest forms for adjustably turning the generator. A fragment of the controller shaft is directed toward the generator and may be considered as connected with the shaft fragment at the generator.

Figure 3 shows the electric deviation or steering indicator intended to be connected with the inductor generator.

The first three views therefore show an example of the three instruments which are adapted to be connected together to form a complete inductor compass system.

Figure 4 is a side elevation of the generator shown in Figure 1, parts thereof being in section, together with its adjustably turnable mounting means carrying the generator and by which particularly the commutator brushes are oriented by the direction controller shown in Figure 2.

Figures 5, 6, 7 and 8 show a modified form of the invention.

Figure 5:
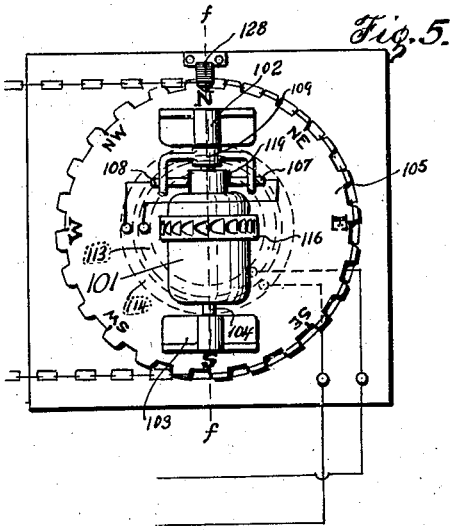

Figure 5 is a plan view of a generator similarly carried by rotary mounting means by which it is adapted to be adjustably turned about a vertical axis, the armature of the generator being mounted horizontally, and its commutator brushes only are stabilized, thus rendering unnecessary, in this form of the invention, the stabilizing of the armature or the complete generator.

Figure 6:
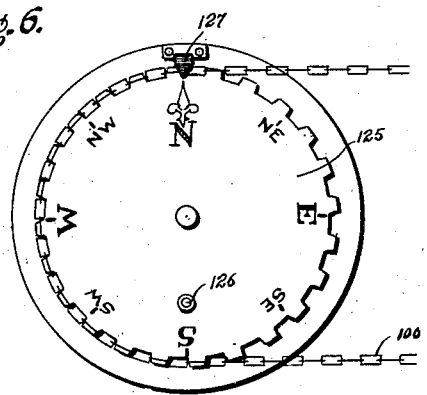

Figure 6 shows a plan view of the direction controller for adjustably turning the generator so that its commutator brushes and armature are bodily swung or turned about a normally vertical axis.

Figure 7:
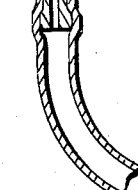
Figure 8:
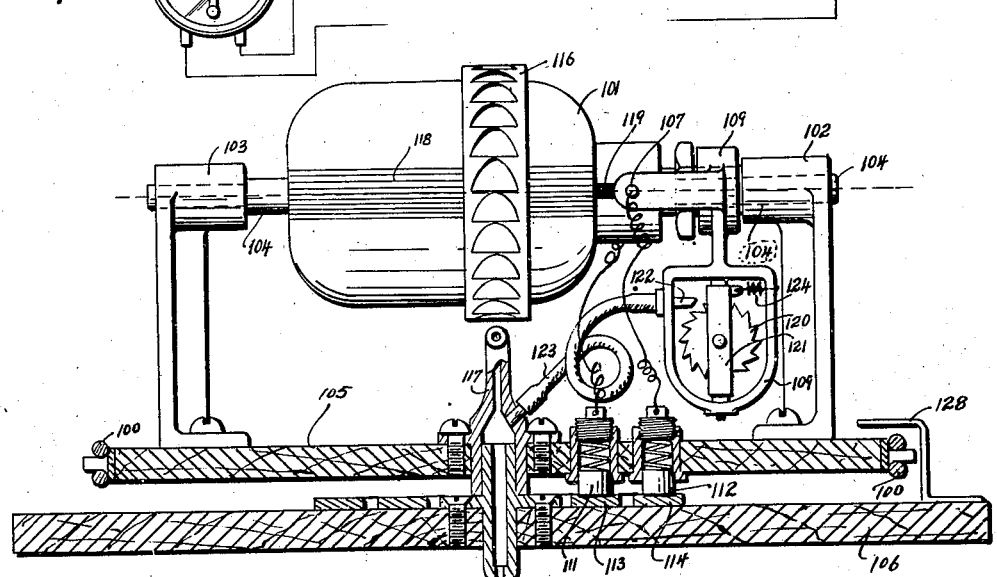

Figure 7 illustrates an electric potential steering or deviation indicator which is to be electrically connected with the generator shown in Figures 5 and 8.

Figure 8 shows a side elevation of the horizontal type generator of Figure 5 together with the rotary mounting means therefor which is in section, this view showing stabilized commutator brushes.

Referring to Figures 1 to 4 to first describe the improvements in inductor generators for the compass system, an armature 51 is journaled in a gyro or generator frame 52 and in this case the armature is disposed on a normally vertical axis M—M. The frame 52 is suspended in a gimbal ring 53 and is free to swing about the normally horizontal axis $p$—$p$ to permit stabilization of the armature on the vertical axis. The gimbal ring 53 is supported on pivots 46 carried by brackets 54 and the gimbal is free to swing about an axis Q—Q to contribute to the aforesaid stabilization of the armature 51. This construction permits inherent stabilization of the generator armature 51 since it produces its own gyroscopic force by which to stabilize itself and since the armature is carried by universal pivot means consisting of the frame 52 and gimbal 53. The brackets 54 are carried by or upon orientable mounting means in the form of a turntable gear 55 which is in turn carried with a stationary installation base or frame 60. The rotary mounting means or gear 55 is adapted to be subjected to an adjustable turning movement or orientation by a compass direction controller.

A vertical journal pin 49 is carried in the base 60 and supports the generator on the turntable or base 55 so the generator may be adjustably turned by a direction controller means to be described, and this journal pin 49 preferably contributes to the driving of the generator armature by transmitting a power medium through or beyond the pin. Also the journal means 49 may act as a center about which slip ring current collecting brushes rotate to transmit current from the generator to the electric potential deviation indicator shown in Figures 3 and 7 to be described. The generator frame or base 60 is adapted to be anchored on the craft in the installation of the compass system, and thus the inductor generator is mounted on an airplane and stabilized, and hence its current collecting brushes are stabilized in a horizontal plane.

The generator may be provided with direction indicating means such as a compass dial or graduated circle similar to a direction controller compass-like dial to be described which facilitates readings and observations taken from the compass and this dial means is best shown in Figure 1. A lubber's line 42 is fixed so to point to the rotating dialed means 55ª. The compass dial 55ª on the gear 55 turns uniformly at the same time the commutator brushes turn and thus shows in terms of direction the angular movement of the brushes.

The armature 51 is driven by any suitable means, and I have shown a turbine wheel 56 fixed to the armature shaft and driven by compressed air which is directed against the wheel 56 by a jet 57. Air is obtained from any suitable source such as an air compressor and is conveyed to the jet 57 through a rubber tube 58 from the tubular journal pin 49 through which compressed air may be transmitted to drive the generator. Mounted on the armature shaft is a commutator 59, and for the sake of simplicity only two armature segments 71 and 72 are shown on the commutator. There is an armature coil which is wound around the armature core and has its ends connected to the segments 71 and 72. Current collecting commutator brushes 77 and 78 are carried on the gyro frame 52 and bear on the commutator 59.

It is to be understood that this invention is not limited to the particular form of armature winding or number of brushes shown because the drawing shows an elementary and simple form of the apparatus so as to facilitate an understanding and explanation thereof. Practically any standard armature winding may be used, and commutator brushes may also be adopted from standard practice.

As is well known to those versed in the art, the direction of the earth's magnetic flux is only horizontal at a few locations on the earth's surface and at most places is inclined at a considerable angle to the horizontal. An inductor compass, as well as the usual type of magnetic compass, is caused to function by the horizontal component of the earth's flux. The vertical component of the earth's flux is largely responsible for the erratic action of the ordinary magnetic compass under certain conditions, and to eliminate the ill effect of the vertical component upon the compass of my invention, means are provided to maintain the inductor plane of the generator so as to gain maximum effect of the earth's horizontal flux lines and minimize or eliminate all effects of the vertical flux lines.

To the above ends, the entire generator may be stabilized or only certain parts thereof are required to be stabilized. It will be shown that in one modified construction, the commutator brushes only are stabilized. As a matter of convenience in design and construction, the brushes 77 and 78 are parts of a stabilized generator in Figures 1 and 4 and hence are themselves stabilized, but several variations are possible in accordance with the principle of my invention.

Wires 67 are attached to the brushes 77 and 78 and connect with slip-rings 79 and 80. As shown, brush 77 is connected to ring 79, and brush 78 is connected to ring 80. The contacts on the slip-rings are made by brushes 61 and 62. From the slip rings, the wires 67' are run to the electric steering or deviation indicator 47 shown in Figure 3, which may be a galvanometer in which electric potential in one direction causes the hand to move to the right of zero, and potential in the other direction causes the hand to move to the left of zero. The galvanometer 47 or the like is suitable for use as a deviation indicator or steering meter as will be explained and it reads null for the correct heading of the craft when ultimately attained by the pilot.

What I call a direction compass controller 45 is shown in Figure 2, and it is used for adjustably turning or orienting the generator and brush mounting means or gear 55, and hence the generator brushes are oriented into any desired position about a normally vertical axis at the will of the operator who actuates the crank shaft handle 99 of the controller. A compass dial 44 is carried with, by or on a controller gear 40 and turns therewith, and there is provided a lubber's line 63 by which to read the direction controller compass-like dial 44. The controller gear 40 is operatively connected to the generator and brush mounting gear 55 through a shaft and manually operable crank means 99 and gears 39 and 43 respectively in such a way that rotation of the gear 40 and of the direction controller dial 44 through a given angle by means of the controller crank, causes corresponding orientation of the generator brushes through the same angle about a normally vertical axis.

A navigator at the direction controller handle 99 may therefore from a distance manually orient the generator brushes about the vertical until the direction compass dial 44 shows the desired direction of travel at the lubber's line 63, at which time the generator brushes 77 and 78 will be in that required position with respect to the direction of the earth's flux lines as will produce no potential and hence a null reading on the deviation indicator 47 when the craft is headed on that direction as shown by the direction controller compass dial 44.

The generator and brush mounting means 55 includes a gear represented by the same reference 55 and the gear is in mesh with a drive gear 43 by which a controller shaft 99' is connected with the generator. The two gears 43 and 55 provide a transmission means for the generator by which the rotary brush mounting means is oriented from the controller 45 which may be located at a distance from the generator.

The disposition of the various units on an aircraft or other vehicle and their practical operation, will now be explained. For the electrical generator unit, a location is chosen which is as free as possible from local magnetic fields. If such local fields do exist, however, they may be compensated in precisely the same way as is well understood in respect to ordinary magnetic compasses.

The direction controller 45 and the steering or deviation indicator 47 are located in positions where they may be convenient to the pilot or navigator of the craft. Electrical connection 67 and 67' is made between the deviation indicator 47 and the generator brushes 77 and 78, as previously described. The direction controller gear 40 and the generator brush mounting gear 55 are mechanically connected by means of chain and sprockets, or shafts and gearing, as illustrated, or by any other suitable method of telemetric interconnection.

This interconnection is such that when the aircraft is headed north, and the direction controller dial 44 shows North at the lubber's line 63, the inductor plane of the armature is then perpendicular to a plane defined by the axis of the armature and the direction of the earth's flux, and hence the electric potential at the commutator brushes 77 and 78 is zero. It therefore follows that no current flows to the deviation indicator 47 and a null or zero reading exists which informs the pilot that the craft is on the right course, i. e. on the course shown by the direction controller dial 44.

In operation, the direction controller 45 has its compass dial 44 set to indicate the desired course at the index 63. The generator and its brushes, being connected mechanically to orient about the journal pin 49 through the same angle as the compass controller dial 44, is therefore turned through that angle indicated in terms of direction by the controller dial, and doubtless the hand of the steering or deviation indicator 47 will deflect to right or left because the aircraft may not yet be on the desired course. The aircraft is then steered or guided around until the steering or deviation indicator 47 shows zero, at which time the heading of the craft will then be that direction indicated at the lubber's line 63 on the controller compass dial 44, and will remain so as long as the pilot steers the craft to maintain zero on the electric steering meter 47.

It will be apparent that a direction 180° off the indicated heading would also produce a null reading on the steering indicator 47 because in that event the earth's flux lines and the generator brushes are again in that relative position where no electric potential is generated. Such unintended or opposite direction may be detected by steering the craft slightly to the right or left to produce an indication at the deviation meter 47. If a turn of the craft to the right causes the meter-hand to move to the right, the heading is correct as read from the controller dial 44. If a turn to the right causes the meter-hand to move to the left, the heading is 180° from correct, and must be corrected by reversing the direction of the craft.

Since there is no current flowing while the direction of the craft is being indicated, there is no magneto-motive force generated, no distortion of the earth's field, and consequently no error is introduced from this source, which is important and contributes to the success of my invention.

While I have shown in Figures 1, 2 and 3 only one direction controller and one steering or deviation indicator connected to the generator, in practice any number of controllers 45 and steering indicators 47 can be used with one inductor generator, thus permitting the direction to be determined at several remotely located places, and enabling a boat or other craft to be equipped with any suitable number of steering or deviation indicating means 47. When used on large aircraft the electric steering or deviation indicator 47 is placed where it is easily observed by the pilot, while in many cases, the direction controller 45 may be placed conveniently to the navigator, perhaps at quite a distance away from the steering or deviation indicator 47 and pilot.

As suggested, the navigator determines the course to be steered and then sets the course on the direction controller compass dial 44 by rotating the controller handle 99 and bringing the dial mark of direction to the index 63. This adjustably turns the generator or brush mounting means 55 and causes the steering or deviation indicator 47 to point to the right or to the left of its zero. The pilot then changes the course of the aircraft until the hand of the indicator 47 comes back to zero, thereby bringing the craft around to the heading the navigator has set on the controller compass dial 44.

It is seen that the compass system is so constructed that the navigator at the direction controller 45 may be some distance from the electric steering or deviation indicator 47, but he can signal the pilot, who is at the deviation indicator 47, the course the pilot must follow, and the navigator does this by merely setting the desired course on the direction controller compass dial 44, whereupon the pilot can read the corresponding course on the similar compass dial 55ª made on the gear 55 in case the generator is visible to the pilot. The controller 45 and steering and deviation indicator 47 may be placed side by side and read together and operated solely by the pilot if desired.

I will now describe another form of my invention. This is illustrated in Figures 5, 6, 7 and 8 wherein an armature 101 is carried on a shaft 104 journaled in brackets 102 and 103 so that the generator is driven about the normally horizontal axis 104. The armature may be driven by compressed air or other suitable means, and I have shown a turbine wheel 116 carried on the armature, and a jet 117 for directing a stream of air against the turbine wheel.

The brackets 102 and 103 are carried on a mounting base turntable or gear 105 which is rotatably carried by a generator base or frame 106 so as to be adjustably turned about a normally vertical axis. The armature is shown as having only one coil 118 with its ends connected to the two commutator segments 119. Brushes 107 and 108 engage the commutator 119 and are carried on two arms of a pendulum 109 which is swingable about the axis 104 of rotation of the generator 101. The turntable mounting gear 105 may be graduated as a compass dial or compass card if desired, although this is not always used since the generator is usually installed at a place not visible and furthermore the controller indicator 125 is sufficient.

A gyroscope 120 is mounted in the pendulum 109 for the purpose of stabilizing or steadying the pendulum 109 and holding the brushes 107 and 108 normally in one given position, as for example, horizontally. This gyroscope rotor 120 is journaled in a gyro frame 121 which is in turn pivoted in the pendulum 109 so that the gyro frame 121 may precess about a normally vertical axis. The axis of precession of the gyro frame 121 is restrained by a centralizing spring 124 so as to normally lie in the plane of movement of the pendulum 109. Any tendency of the pendulum 109 to swing is resisted by the gyroscope which stabilizes the brushes in a horizontal plane even though the entire generator unit itself may roll or pitch due to the movement of the craft.

The gyroscope 120 is driven in any suitable manner, and I have shown it driven by a stream of air which is directed against notches on the circumference of the gyroscope by the jet 122. Air is conveyed to the jet through a flexible tube 123.

Wires from the commutator brushes 107 and 108 are carried to slip ring brushes 111 and 112 which make contact with the slip rings 113 and 114. These slip rings are electrically connected to a galvanometer steering or deviation indicator Figure 7 which may be similar to that shown in Figure 3 and previously described.

The direction controller 125 shown in Figure 6 performs the same functions in rotating the generator mounting gear 105 of Figure 5 as the direction controller Figure 2 does in rotating the turntable gear 55 in Figure 1. In Figures 5 and 6, I have shown the generator mounting gear 105 and controller compass dial indicator 125 connected together by a sprocket chain 100 so that they can be correspondingly and adjustably turned together through the agency of a handle 126 fastened to the compass dial means 125, so that it may be easily grasped by an operator.

To illustrate the operation of the compass in this form of the invention (in Figures 5 through 8) I will first assume that the compass direction is as indicated by the graduated compass controller card 125, that is, with the axis $f$—$f$ of the generator in a N and S direction. As the armature 101 rotates, the coil 118 cuts the lines of flux of the earth's magnetic field. In the position shown, however, the coil is not effectively cutting any lines at the time it is connected, through the commutator bars 119, with the brushes 107 and 108. The radial portions of the coil are, it is true, cutting lines at this time, but each in a direction opposite to the other. There is therefore no potential between the brushes, and hence no effect upon the galvanometer deviation indicator Figure 7, and therefore the heading of the craft is as shown on the direction controller index 127, namely north.

I will now assume, however, that the vehicle carrying the compass turns to the right, or clockwise. As the armature coil 118 rotates it now cuts lines of flux and it is apparent that an electric potential is generated in the coil which gives to the brush 108 a positive potential and to brush 107 a negative potential. The connections in the galvanometer Figure 7 are such that this potential causes the hand to move to the right, indicating that the vehicle is headed to the right of the direction shown on the direction controller dial 125; and if it is desired to ascertain the direction of the vehicle, the controller is rotated to the left (counter-clockwise) until the galvanometer returns to zero, and the position of the direction controller index 127 or the index 128 or both indexes then show the new direction in which the vehicle is headed.

But, if on the other hand, it is desired to bring the vehicle back to the heading indicated on the direction controller 125, said controller is not disturbed, but the vehicle is steered to the left until the steering or deviation indicator Figure 7 returns to zero or a null reading.

It will be seen that I have illustrated two alternate means for accomplishing the purpose previously set forth, i. e. to so relate the armature and brushes of the generator to each other and to the earth's field, that the inductor plane of the armature is maintained perpendicular to a plane defined by the armature axis and the direction of the earth's flux. In the examples shown, the said means includes instrumentalities to stabilize the brushes in a given position together with a direction controller for adjustably turning the generator brushes in azimuth, i. e. about the vertical. However, it should also be understood that the alternate possibilities of arrangement of armature and brushes are not exhausted by the two forms shown in my drawings within the scope of this invention and the purposes above set forth, because the compass direction controller functions perfectly to orient the brushes or the generator, one or the other, whether or not they be stabilized.

One of the armatures shown is on a vertical axis, the other upon a horizontal axis.

Any angle between the vertical and horizontal might have been selected so long as the inductor plane of the generator is established or maintained in a given position. Obviously, every possible angle cannot be illustrated. In case the armature axis is inclined the generator is adjustably turned in azimuth through the angle necessary to bring the inductor plane of the armature into the position above defined. The compass then functions exactly the same as in the case of the two modifications which I have illustrated.

Since the inductor plane of the armature in both forms of the invention is maintained perpendicular to a plane defined by the axis of the armature and the direction of the earth's flux, while the direction is being indicated, no error is introduced by the movements of the craft upon which the compass is mounted. Both sources of error which have been identified with previously proposed devices of remotely similar nature are therefore eliminated by my invention, and it fills a need felt for a reliable compass especially on airplanes.

The compass controller as shown in Figures 2 or 6 is an important element in this inductor compass system and though above referred to merely for an understanding of the mode of operation and use of the entire system, it will now be explained in further detail and some of its characteristics apart from the compass combination will be explained.

A frame or base 45 rotatably supports a compass or direction indicating or controller dial 44 which turns about a shaft 41 carried in the base. The compass dial 44 cooperates with and is turned by a gear 40, and the lubber's line 63 shows the direction indicated on the controller compass dial. In the example of compass controller shown, the dial 44 is mounted upon and turns with the gear 40 but many modifications of construction may be made under the principle of the invention. The compass controller dial 44 is marked similar to an ordinary compass card and is read in the same way.

The compass controller 45 is connected by gear 40 and shaft means 99' or the like to the inductor generator, and the compass dial 44 and brushes 77 and 78 are designed to turn at the same angular rate so that the navigator at the compass controller 45 may set the inductor generator brushes in the desired position by observing the compass dial indication at the index 63.

For example, the navigator or the pilot knows, by setting a given direction, say north, into the compass dial 44, that the generator brushes will be similarly oriented to a zero potential position, i. e., to a position where no potential is produced (hence a null reading on the galvanometer 47) when the craft shall have been steered to a north heading, whereupon the pilot may depend upon a correct north heading by altering the craft's direction until a null indication is attained on the deviation indicator 47 and by maintaining the craft on that heading.

Any suitable form of controller drive may be provided, i. e., manual or power, by which the compass dial 44 and generator brushes are simultaneously and uniformly oriented. A crank shaft means 99 is provided both as a drive through a worm 39 to the dial gear 40 and as a transmission means with pinion 43 to connect with the generator and brush mounting gear 55. The gear ratios at the compass controller transmission gearing 39—40 and at the generator transmission gearing 43—55 are the same so as to attain the same rate of turn for the compass controller dial and generator brushes, and by reason of this arrangement the angle of orientation of the brushes is directly shown at the controller in terms of compass direction.

Preferably the worm gears 39 and 43 are relatively smaller than the larger gear means with which they engage and the pitch of the worms 39 and 43 are so designed that many turns of the crank shaft means 99 are required to effect a 360 degree oriented adjustment of the compass dial and the generator brushes. Furthermore a finer and closer range or fractional degree setting of the compass dial 44 and generator brushes 77 and 78 may be attained if a relatively low gear reduction be employed to turn the controller and brushes. The gear reduction 39—40 and 43—55 also eliminates or greatly reduces errors in the compass dial setting which would be otherwise introduced by reason of back lash in the long shafting 99' and its various connections. The shafting 99' enables the compass controller and inductor generator to be remotely installed on the craft if that be desired.

A worm and worm wheel type transmission 43—55 are chosen for one form of the invention by which to turn the generator brush mounting means and hence orient the brushes because this type of transmission interlocks against accidental displacement and thus restrains the brushes against movement by vibration but instantly permits a resetting of the brushes at the will of the operator.

It is obvious that the compass system is simple to install, that the generator may be placed in any convenient and efficient location, that it is reliable and rugged in construction, that a fine compass setting is possible. The galvanometer or steering meter indicator 47 is sensitive to the slightest deviation from the heading on the compass dial, and the invention fills a need long felt.

What I claim is:

1. An earth inductor compass system comprising; a generator having an armature and commutator having current-collecting means, including means for mounting the current-collecting means for orientation through any desired angle about a normally vertical axis; a controller, means interconnecting said controller with the generator to effect the angular setting of the current-collecting means, means to indicate the angle through which the current-collecting means are oriented; and an electric potential deviation indicator connected with the current-collecting means.

2. An earth inductor compass system comprising; a generator having an armature and commutator having current-collecting means, including means for mounting its current-collecting means for orientation through any desired angle about a normally vertical axis; stabilizing means for establishing the inductor plane of the armature in such position that the intersection of said plane with any plane perpendicular to the armature axis is normally horizontal; a controller, means interconnecting said controller with the generator to effect the angular setting of the current-collecting means, means to indicate the angle through which the current-collecting means are oriented; and an electric potential deviation indicator connected with the current-collecting means.

3. An earth inductor compass system comprising; a generator having an armature, a commutator and brushes, and including means for mounting its brushes for orientation through any desired angle about a normally vertical axis; stabilizing means for the armature to establish its axis substantially vertical; a controller, means interconnecting it with the generator to effect the angular setting of the brushes, means to indicate the angle through which the brushes are oriented; and an electric potential deviation indicator connected with the brushes.

4. A compass comprising in combination, an electric generator including an armature, a commutator and brushes, a mounting base supporting the generator for adjustable turning movement about a normally vertical axis, means for rotating the armature in the earth's magnetic flux to produce electric potential, a direction controller and connections for adjustably turning the mounting base and generator about said vertical axis, and an electric deviation indicator connected with the commutator brushes.

5. A compass comprising in combination, a generator including an armature, commutator and brushes, mounting means supporting the generator for adjustable turning movement about a normally vertical axis, driving means for rotating the armature in the earth's magnetic flux to produce electric potential, a direction controller and connections for adjustably turning the mounting means and generator about said vertical axis, an electric potential responsive steering indicator connected with said brushes, and an indicator of compass direction operated by the controller to show the angular movement of said generator.

6. A compass comprising in combination, a generator including an armature, a commutator and brushes, mounting means supporting the generator for adjustable turning movement about a normally vertical axis, driving means for rotating the armature in the earth's magnetic flux to produce electric potential, a direction controller and connections for adjustably turning the mounting means and generator about said vertical axis, electric potential responsive steering indicating means connected with said brushes, and a direction indicator carried on and turning with the mounting means to show its adjusted position.

7. A compass comprising in combination, a generator including an armature, a commutator and current collecting brushes, mounting means supporting said brushes for adjustable turning movement about a normally vertical axis, driving means for rotating said armature in the earth's flux to produce electric potential, means for establishing the inductor plane of said armature perpendicular to a plane defined by the axis of said armature and the direction of the earth's flux, said last named means including a direction controller for adjustably orienting the mounting means and brushes togther with means for stabilizing said brushes and a direction indicator operated by the direction controller, and turning with the brushes, and a deviation indicator connected with the brushes.

8. A compass comprising in combination, a generator including an armature and current collecting means, gear means supporting the generator current-collecting means for orientation about a normally vertical axis, driving means for rotating said armature in the earth's flux to produce electric potential, means for establishing the inductor plane of said armature perpendicular to a plane defined by the axis of said armature and the direction of the earth's flux; and said last named means including a direction controller means for adjustably orienting said current-collecting means together with gyroscopic means for stabilizing said current-collecting means; a direction indicator connected with and turned by the direction controller to show the desired heading, and an electric steering indicator connected with the current-collecting means and showing a null reading when traveling on said desired heading.

9. A compass comprising in combination, a generator including an armature, a commutator and current collecting brushes, mounting means supporting the brushes for adjustable turning movement about a normally vertical axis, driving means for rotating the armature in the earth's magnetic flux to produce electric potential, a direction controller and connections for turning the mounting means and brushes about said vertical axis on operation of said controller, an electric potential steering indicator connected with said generator brushes, and stabilizing means for establishing or maintaining the current collecting brushes in substantially a given position in relation to a horizontal plane.

10. A compass comprising in combination, a generator including an armature, a commutator and brushes, mounting means supporting the generator for adjustable turning movement about a normally vertical axis, driving means for rotating the armature in the earth's magnetic flux to produce electric potential, a direction controller and connections for turning the mounting means and generator about said vertical axis, an electric potential steering indicator connected with said brushes, and stabilizing means for establishing the generator in substantially a given position in relation to a horizontal plane.

11. A compass comprising in combination, a generator including an armature, a commutator and brushes, mounting means supporting the generator for adjustable turning movement about a normally vertical axis, driving means for rotating the armature in the earth's magnetic flux to produce electric potential, a direction controller for turning the mounting means and generator about said vertical axis, an electric potential steering indicator connected with said brushes, and stabilizing means for establishing the axis of the generator in substantially a vertical position.

12. A compass comprising in combination, a generator including an armature, a commutator and brushes, gyroscopic force producing means, a universally pivoted means sustaining the generator whereby it inherently stabilizes itself gyroscopically, mounting means supporting the universally pivoted means and generator for adjustable turning movement about a normally vertical axis, driving means for rotating the armature in the earth's magnetic flux to produce electric potential, a direction controller for turning the mounting means about said vertical axis, and electric potential responsive means connected with said brushes and adapted for use as a steering indicator.

13. A compass comprising in combination, an electric generator including an armature, a commutator and brushes, a gimbal ring by which the generator is sustained and in which it inherently stabilizes itself gyroscopically, a mounting gear supporting the aforesaid gimbal ring and generator for turning movement about a normally vertical axis, means for rotating the armature in the earth's magnetic flux to produce electric potential, a direction controller for turning the mounting gear with its stabilized generator about said vertical axis, and an electric deviation meter connected with the brushes and used as a steering indicator.

14. A compass comprising a generator including an armature and brushes, mounting means supporting the generator for adjustable turning movement about a substantially vertical axis, stabilizing means for maintaining the axis of the armature in substantially a given position, an indicator of electric potential connected with the brushes and used to indicate deviation, a direction controller including a direction indicator adapted to be set upon a desired course, and a connection between the direction controller and mounting means, whereby manual operation of said direction controller acts to adjustably turn the generator brushes and the direction indicator.

15. A compass comprising in combination, an electric generator having an armature the axis of which is normally vertical, mounting means adjustably turnable about a normally vertical axis and supporting the generator for universal movement, said vertical axis of both the generator armature and mounting means being normally coincidently disposed, stabilizing means maintaining the generator armature on a substantially vertical axis irrespective of the relative position of the axis of the mounting means, driving means for rotating the generator armature to produce electric potential, an electric deviation indicator connected with the generator armature, and a manually operable direction controller connected with the mounting means to orient the generator.

16. A compass comprising in combination, an electric generator including brushes and a commutator and an armature rotating in the earth's field, means for stabilizing said generator, a steering meter connected with the brushes to indicate potential, a compass card from which course or heading is read, a rotary mounting device carrying the generator and adjustable about a normally vertical axis while stabilized as aforesaid, a direction controller and means connecting it with the compass card to turn said card to indicate the desired course or heading, and means connecting the direction controller with the aforesaid rotary mounting device to orient the generator to a position in the earth's field where it discontinues the generation of potential thereby producing a null reading on the aforesaid steering meter when the vehicle is headed as indicated on the compass card.

17. A compass as defined in claim 16 characterized by a graduated direction indicating dial carried on the rotary mounting device.

18. A compass system comprising in combination, a direction controller, a steering meter, a frame, a base, a turntable pivoted for rotary movement relatively to said base, a connection between the controller and turntable for orienting the latter, a gimbal suspension interposed between said turntable and said frame, a shaft journaled in said frame, an armature carried upon said shaft, current collecting means interposed between said armature and said frame, current collecting means interposed between the turntable and base, electrical connections between the first named current collecting means and second named current collecting means, and electrical connections established between said second named current collecting means and the aforesaid steering meter.

19. A compass comprising, a base, journal means extending therethrough, a rotary mounting means carried on the journal means, a universally pivoted carrying means on the mounting means, a generator sustained in the carrying means to inherently stabilize itself, means driving the generator to produce electrical potential and gyroscopic force, a deviation indicator connected with the generator, and a direction controller and connections to adjustably turn the mounting means.

20. A compass comprising, a base, a journal carried thereby, a rotary mounting means spaced from the base and adapted to turn about the journal, a universally pivoted carrying means on the rotary mounting means, a generator and driving means therefor sustained in the carrying means, means by which driving energy is transmitted from the base to said driving means to drive the generator to produce electric potential and gyroscopic force, a steering indicator connected with the generator and operated by the potential, a direction controller and connection between said controller and rotary mounting means to adjustably turn the mounting means.

21. A compass as defined in claim 20 wherein the journal extending through the base is provided with a passage, the driving means including an air driven member, and an air connection between the passage and air driven member.

22. An earth inductor compass system comprising in combination; an inductor generator, including current collecting brushes, a commutator, and an armature; rotary mounting means supporting the generator brushes for orientation about a normally vertical axis; means for establishing the inductor plane of said armature in a given position perpendicular to a plane defined by the axis of said armature and the direction of the earth's flux, including gyroscopic stabilizing means, a direction controller and a compass dial; an electric steering indicator connected with the generator brushes and showing a null reading when the inductor plane of the armature is maintained in the aforesaid given position; and the generator and direction controller being mounted in spaced relation, and an interconnection therefor between the generator and controller by which the rotary mounting means, the generator brushes, and the compass dial are simultaneously oriented at the same rate.

23. An earth inductor compass comprising in combination; a generator including an armature and current collecting brushes, a generator brush supporting gear adapted to turn about a normally vertical axis and carrying the brushes therewith, and a drive gear engaging the brush supporting gear; a controller shaft and operating means therefor fixed to the drive gear, a second drive gear fixed on the controller shaft in spaced relation from the first named drive gear, a compass direction controller gear driven by the second named drive gear, and a compass dial connected with and turned by the compass direction controller gear; and the aforesaid gears comprising a slow motion drive by which the compass dial and brushes are oriented at a slower rate than the controller shaft turns, and having gear reduction ratios of equal value by which the compass dial and brushes are uniformly turned at the same angular rate; and a potential steering indicator connected with the brushes.

24. An earth inductor compass comprising, a generator having an armature and current-collecting means, means for orienting the inductor plane of said generator about a normally vertical axis, means indicating the angle through which said inductor plane is oriented, and means indicating the electric potential across said current-collecting means.

25. An earth inductor compass comprising, a generator having an armature and commutator brushes, means for orienting the inductor plane of said generator about a normally vertical axis, means indicating the angle through which said inductor plane is oriented, means indicating the electric potential across said brushes, and means establishing the inductor plane in such relation to the armature axis that the line of intersection of said inductor plane with any plane perpendicular to said axis is normally horizontal.

26. An earth inductor compass comprising, a generator having an armature and commutator brushes, means for orienting the inductor plane of said generator about a normally vertical axis, means including a compass dial and operatively connected with the brushes for indicating in terms of direction the angle through which said inductor plane is oriented, and means indicating the electric potential across said brushes.

27. An earth inductor compass comprising, a generator having an armature and commutator brushes, means for orienting the inductor plane of said generator about a normally vertical axis, means including a compass dial and operatively connected with the brushes for indicating in terms of direction the angle through which said inductor plane is oriented, means indicating the electric potential across said brushes, and means including a gyroscopic stabilizer for establishing the inductor plane in such relation to the armature axis that the line of intersection of said inductor plane with any plane perpendicular to said axis is normally horizontal.

28. A compass comprising in combination, an earth-inductor generator including a rotatable gyroscopic armature and a commutator and brushes therefor, means supporting the generator for universal pivotal movement, means for mounting said supporting means so as to be adjustable about a normally vertical axis, a direction controller and connections for making such adjustment, means for driving the armature in the earth's field, electric potential-responsive means adapted for use as a steering indicator and connections therefrom to the generator brushes.

29. A compass comprising a generator having brushes and an armature, means for universally mounting said armature, a stabilizing means for establishing the axis of rotation of the armature substantially vertical, a deviation indicator operated by the generator, a controller including an indicator of direction capable of being set upon a desired course, and a connection established between the controller and generator whereby manual operation of the controller acts to orient the generator brushes about the armature axis.

30. A controller for an earth inductor compass system, comprising in combination with generator current-collecting means and rotary mounting means therefor, of a driven member adapted to be connected with the rotary mounting means, manually rotatable means to operate the driven member, a speed reducing connection between said driven member and manually rotatable means, and direction dial means operated by the driven member.

31. A controller for an earth inductor compass system, comprising in combination with generator brushes and rotary mounting means therefor, of a driven member adapted to be connected with the rotary mounting means, a manually rotatable shaft connected with the driven member, reducing gears between the shaft and driven member, and direction dial means operated by the driven member.

32. A direction controller for earth inductor compasses comprising, a compass dial and index, gear means by which the dial is turned, a crank shaft to operate the gear means, another gear means located remotely from the first named gear means, the crank shaft aforesaid being operatively connected with both gear means to turn the same, and means associated with the last named gear means to mount a generator having current collecting brushes and for orienting said brushes simultaneously with the turning movement of the compass dial.

33. A compass controller comprising, in combination with generator brushes and rotary mounting means carrying them for orientation, a compass dial, a gear cooperating therewith to orient the compass dial, a controller shaft adapted to be connected with the rotary mounting means, means to drive said shaft, and a reduction gearing connected with the first named gear and with the shaft by which the compass dial turns at a slower rate than the controller shaft and drive means.

34. A controller for an earth inductor compass system comprising the combination with inductor generator brushes and rotary mounting means carrying them for orientation, of operating means adapted to be connected with the rotary mounting means for orienting and setting the brushes; and means connected with and turned by the operating means to indicate, in terms of direction, the value of the angular displacement through which the brushes are oriented and set.

35. A controller for an earth inductor compass system comprising the combination with inductor generator brushes and rotary mounting means carrying them for complete orientation, of operating means adapted to be connected with the rotary mounting means for orienting and setting the brushes; and a compass dial connected with and turned by the operating means to indicate, in terms of direction, the value of the angular displacement through which the brushes are oriented and set.

36. A controller for an earth inductor compass system comprising the combination with inductor generator brushes and rotary mounting means carrying them for complete orientation; and operating means including a shaft connection adapted to be operatively attached to the rotary mounting means for orienting and setting the brushes, and means for driving the shaft; and a compass dial connected with the shaft and rotated therewith simultaneously with the orientation of the brushes.

37. A controller for an earth inductor compass system comprising the combination with inductor generator brushes and rotary mounting means carrying them for complete orientation; and operating means including power transmitting means adapted to be connected with the rotary mounting means for orienting and setting the brushes, and a crank for manually operating the power transmitting means; and an indicator of direction connected with the crank, with the power transmitting means, and with the rotary mounting means to measure the angle, in terms of direction, of the orientation of the brushes.

In testimony whereof I affix my signature at N. Y. city this 31st day of January, 1922.

MORRIS M. TITTERINGTON.